(12) United States Patent
Jordan (10) Patent No.: US 11,758,897 B2
(45) Date of Patent: Sep. 19, 2023

(54) MULTI-CONTAINMENT LARGE ANIMAL TRAP

(71) Applicant: Robert A. Jordan, Bloomfield, NM (US)

(72) Inventor: Robert A. Jordan, Bloomfield, NM (US)

(73) Assignee: SJB OPERATING LLC, Bloomfield, NM (US)

( * ) Notice: Subject to any disclaimer, the term of this patent is extended or adjusted under 35 U.S.C. 154(b) by 0 days.

(21) Appl. No.: 17/333,807

(22) Filed: May 28, 2021

(65) Prior Publication Data

US 2021/0368774 A1    Dec. 2, 2021

Related U.S. Application Data

(60) Provisional application No. 63/031,068, filed on May 28, 2020.

(51) Int. Cl.
| | |
|---|---|
| *A01M 23/00* | (2006.01) |
| *A01M 23/02* | (2006.01) |
| *E05B 47/00* | (2006.01) |
| *A01M 31/00* | (2006.01) |
| *A01K 1/00* | (2006.01) |
| *G08B 3/10* | (2006.01) |

(52) U.S. Cl.
CPC .......... *A01M 23/02* (2013.01); *A01K 1/0035* (2013.01); *A01M 31/002* (2013.01); *E05B 47/0002* (2013.01); *G08B 3/10* (2013.01)

(58) Field of Classification Search
CPC ........ A01K 3/00; A01K 3/0001; A01K 3/006; A01K 1/00; A01K 1/0005; A01K 1/0011; A01K 1/0017; A01K 1/0023; A01K 1/0029; A01M 23/00
See application file for complete search history.

(56) References Cited

U.S. PATENT DOCUMENTS

| | | | | |
|---|---|---|---|---|
| 3,545,407 A | * | 12/1970 | Moore ...................... | A01K 1/02 119/20 |
| 2014/0261234 A1 | * | 9/2014 | Gillis ...................... | A01K 15/02 |
| 2018/0064094 A1 | * | 3/2018 | Cantrell ................. | A01M 31/00 |
| 2018/0077919 A1 | * | 3/2018 | McNew ................. | A01M 23/20 |
| 2018/0249701 A1 | * | 9/2018 | Sponholz ............... | A01M 31/00 |
| 2019/0098874 A1 | * | 4/2019 | Burton ................... | A01K 29/00 |

* cited by examiner

Primary Examiner — Joshua J Michener
Assistant Examiner — Henry Hooper Mudd
(74) Attorney, Agent, or Firm — Aurora Consulting LLC; Ty F. Davis; Ashley Sloat (57) ABSTRACT

A trap for large animals. The system utilizes multi-containment areas for improved efficiency in herd animal trapping. The outer containment zone of the system is designed in such a way to promote animals further into the inner containment zone. The improved efficiency lowers overall cost of trap operation in terms of time, consumable bait replenishment and number of attempts on target animal groups. The system allows for independent and remote actuation of containment zone gates. Data is transmitted to a remote user and remote actuation of attracting or deterring audio can be done during trapping process. The architecture of the trap dissuades animals capable of jumping from doing so over the containment walls.

16 Claims, 12 Drawing Sheets

MULTI-CONTAINMENT LARGE ANIMAL TRAP

CROSS-REFERENCE TO RELATED APPLICATIONS

This application claims priority to and the benefit of the filing of U.S. Provisional Patent No. 63/031,068, filed on May 28, 2020, entitled "Multi-containment Large Animal Trap", and the specification and claims thereof are incorporated herein by reference.

BACKGROUND OF THE INVENTION

Animal species such as wild horses, wild hogs and many other prolific wildlife can cause significant damage to agriculture when over-population occurs. For the purpose of disclosure, the example embodiment of the present invention is adapted for means of wild horse trapping and relocation but is not limited to such. The scope of the present invention includes all types of animals, but wild horses will be used as the example species.

Rural areas experiencing overpopulation of wild horses can encounter over-grazing damage and direct competition between said horses and domestic livestock herds, causing economic losses to local farmers and ranchers. Furthermore, habitat crucial to the sustainment and conservation of local wildlife can be directly impacted by unbalanced wild horse populations, causing the deterioration of said wildlife herds, especially in times of drought.

A solution to the local impacts of over-populated wild horse herds must be economic as well as humane. The solution, championed by most, is the trapping and the relocation of said animals.

Suitable traps must be easily transported and easily assembled due to the remoteness of most installations and frequency of relocation. In addition, traps must be reliable as to not educate targeted animals to their purpose due to unsuccessful trapping attempts.

Trapping wild horses and other family group-based species presents unique issues. Inventions known in the art are capable of trapping horses or other animals, but lack the ability to attract target animals while deterring un-wanted animals and independently close portions of the trap area to increase their effectiveness. In addition, the trap architecture must not allow an animal, such as a horse, a large enough, un-obstructed path in which the animal can gain enough momentum to jump the enclosure perimeter.

Inventions known in the art employ feed, water, minerals, and other consumables to entice target animals into trap areas, but these methods and devices are indiscriminate and in many cases the consumables are lost to un-targeted wildlife. Inventions known in the art are capable of remote actuation once target animals are in the trap confinement, but the device is only capable of one trapping actuation. In other words, once the trap is triggered, effectively, the animals inside the trap area are included and the animals outside the trap area are excluded. This characteristic becomes especially troublesome when a group of targeted animals include individuals that are experienced with traps, making them untrusting of the trap confinement.

SUMMARY OF THE INVENTION

The present invention provides methods and devices for the transportation, assembly, monitoring and actuation of an architecturally improved large animal trap. More particularly, the present invention employs two or more independently controlled containments to trap whole groups of animals more effectively. The present invention also includes methods and devices to the attract targeted animals while deterring un-wanted animals.

Advantages and novel features will become apparent to those skilled in the art upon examination of the following description and can be learned by the practice of the invention.

DETAILED DESCRIPTION

Figure 1:
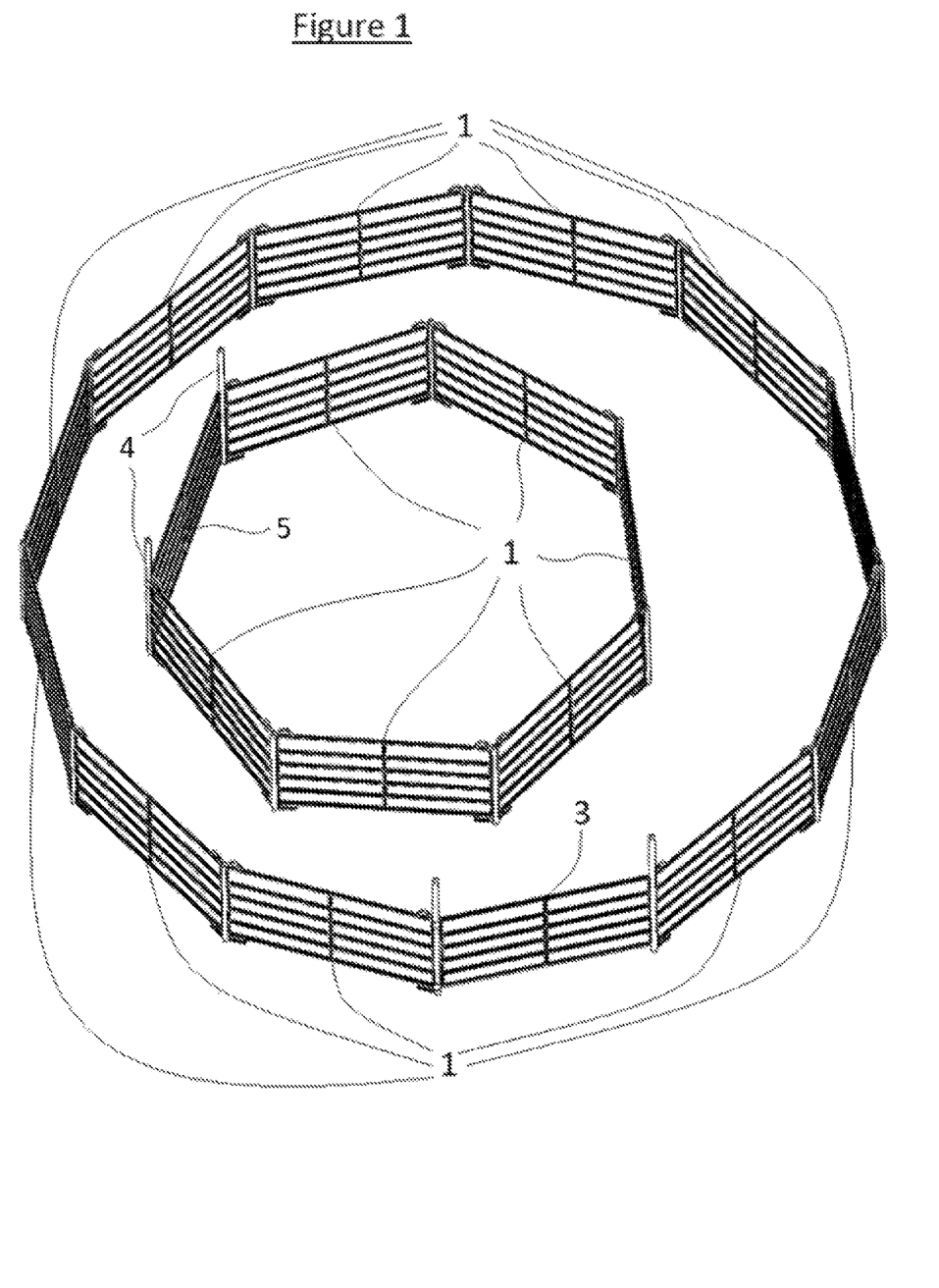
FIG. 1 depicts the preferred embodiment of the present invention with both gates closed.

FIG. 1 depicts the present embodiment of the invention and is adapted for wild horse trapping and relocation. These adaptations are shown for demonstrative reasons and are not made in such a way to limit said invention to only Equidae trapping. The present invention can be easily modified for the trapping of a multitude of different animal species. The area inside the inner perimeter will be referred to as the inner containment and the area between the outside of the inner perimeter and the inside of the outer perimeter will be referred to as the outer containment.

FIG. 1 is an example of the present invention in which both apertures are closed. The inner and outer perimeters are constructed with livestock panel 1 (prior art). Livestock panel 1 can be fastened to each other via chains, in a knuckle joint method or any other method known in the art. Preferably, livestock panel 1 is tall enough to deter trapped animals from jumping over and has small enough spacing between the horizontal framing to avoid animal attempts to squeeze between. The outer perimeter of the depiction in FIG. 1 is circular. This geometric construction is also included in the inner perimeter. Circular containments are essential when trapping and handling feral animals from the Equidae species. Such animals can run at high speeds and jump quite well. Once trapped, the anxious animals may begin to run around the inner diameter of either the inner perimeter or the outer perimeter of the containment. If restrictions such as corners were introduced to these paths, they would become a focal point for escape attempts and/or hazards to a running animal. Unlike a single containment area trap, this dual containment also obstructs any contained animals from utilizing an unobstructed path across the containment area, decreasing the odds of an animal gaining enough speed to jump over the outer perimeter.

Figure 2:
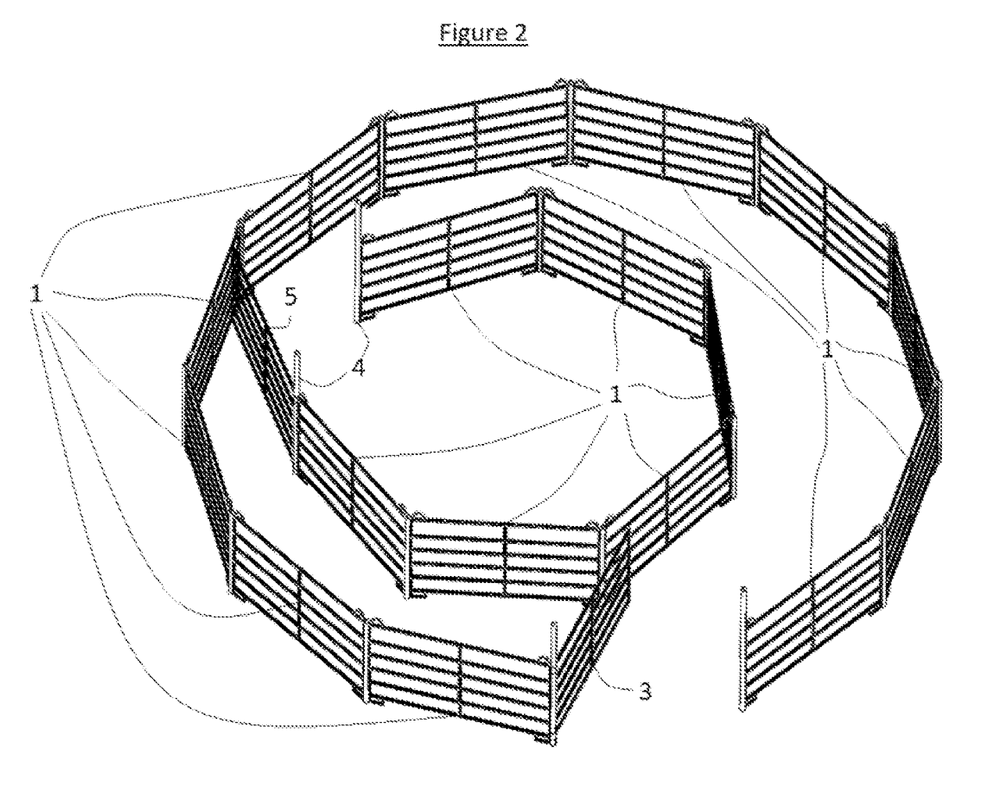
FIG. 2 depicts the preferred embodiment of the present invention with both gates open.
Figure 3:
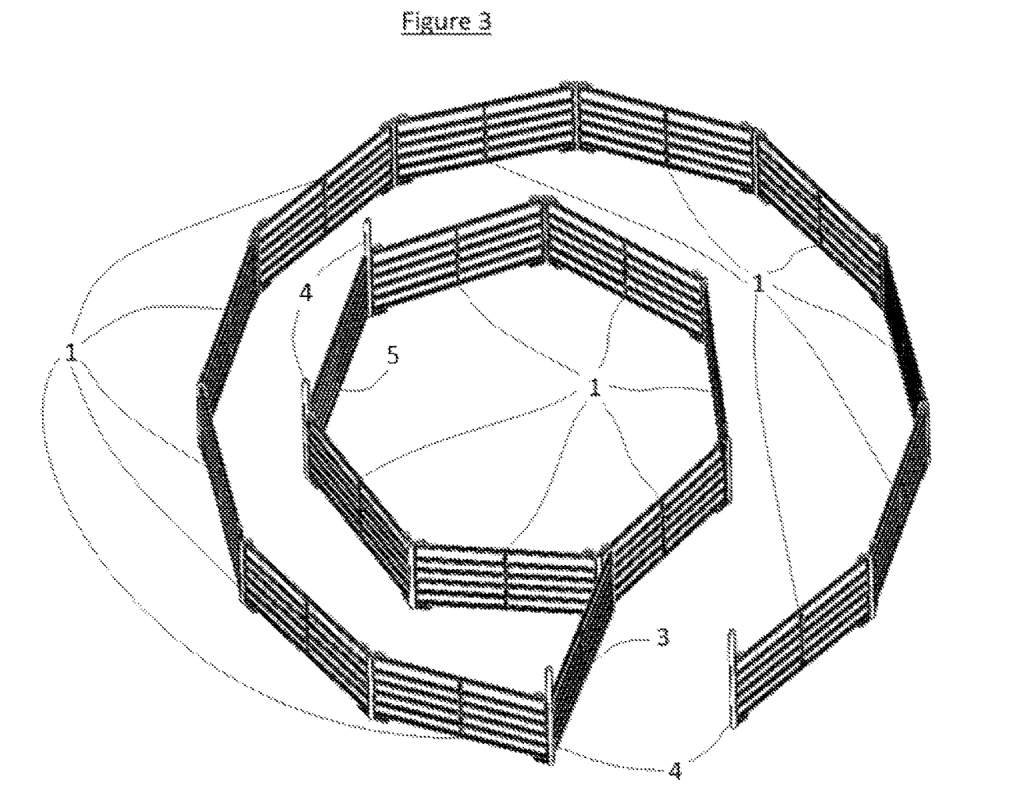
FIG. 3 depicts the preferred embodiment of the present invention with the inner gate closed and the outer gate open.

FIG. 2 gives a depiction in which it is easier to observe the inner gate panel 5 and outer gate panel 3. Both the inner and outer containments have apertures which allow animal to pass through or be contained by inner gate panel 5 and outer gate panel 3 based on their position. FIGS. 1, 2 and 3 demonstrate three possible configurations of the present invention. As previously stated, when dealing with family or social groups, it is preferable to trap all members at one time. FIG. 2 shows how the present invention is intended to be set with both inner gate panel 5 and outer gate panel 3 open. Feed and/or any other consumables can then be placed inside the inner containment and/or the outer containment. It is preferable that the targeted animal group arrives and is, as one group, enticed through the first aperture created by the outer gate panel 3. At which point the outer gate panel 3 can be closed, trapping the animal group inside the outer containment. Then, either by seeking an escape route or further enticement by said consumables, the animal group enters the inner containment area, at which time the inner gate panel 5 is shut, confining the animals in the smaller and easier to handle inner containment. At this point other scenarios can be introduced that the multi-containment capability of the present invention can solve, and which other apparatus known in the art cannot. Such a scenario could be one in which only part of the animal group enters through outer panel gate 4 aperture, perhaps due to leery individuals, leaving several target animals outside of the containment. In such a scenario, outer gate panel 5 is left open allowing the partial group to be enticed further into the trap and eventually into the inner containment, at which time the inner gate panel 5 can be closed, trapping the partial group inside. Upon initial closing of inner gate panel 5, the entire group of target animals may be startled but through practice it has been found that the confined target animal group will settle and resume feeding and/or watering. After some time, the excluded animal group, which has not left due to family or social ties, will eventually be enticed through the outer gate panel 3, at which point it can then to be closed, trapping the entire animal group.

Figure 4:
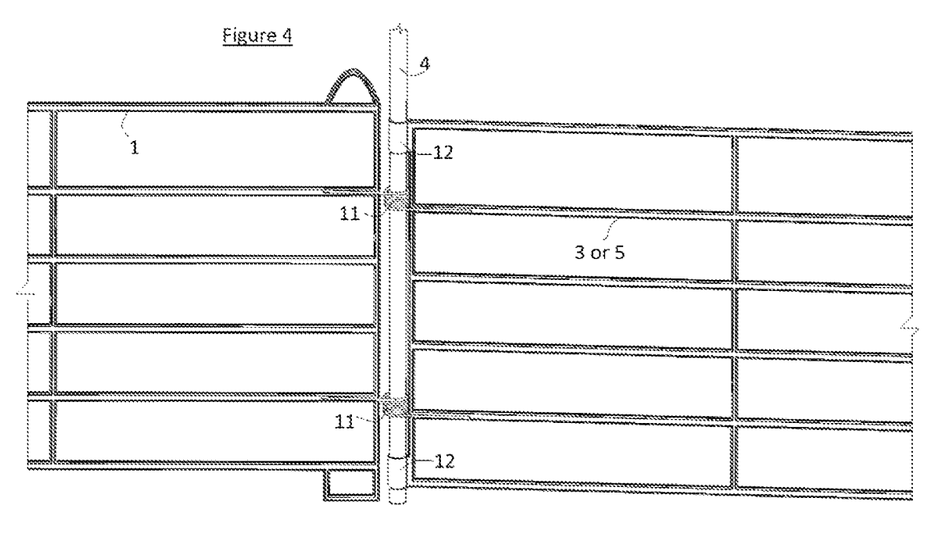
FIG. 4 depicts the bias component responsible for rotating the gate panel closed.
Figure 5:
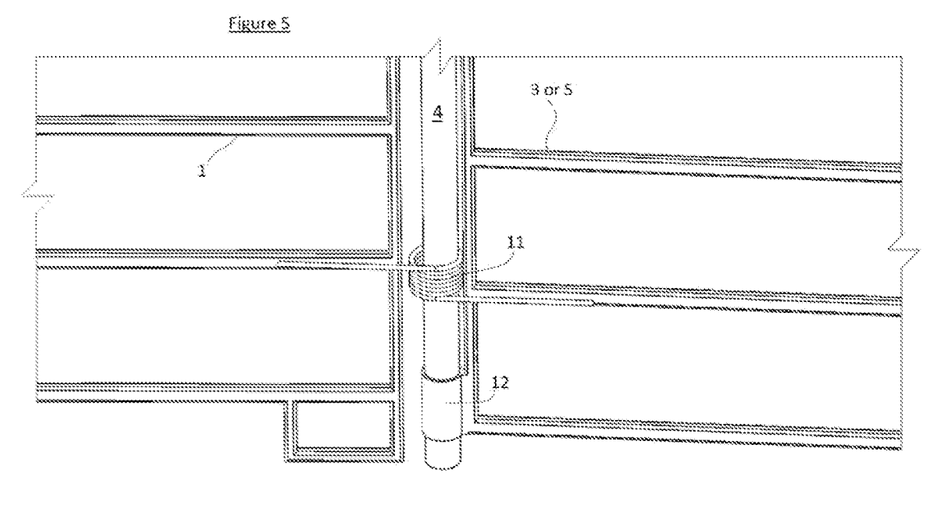
FIG. 5 is a closer view of FIG. 4.

Inner gate panel 5 and outer gate panel 3 are both released and actuated with the same method. When positioning inner gate panel 5 and outer gate panel 3, they are pressed toward the open position and in the load direction of a bias component. In the preferred embodiment of the present invention this bias component is shown as torsion spring 11 in FIG. 4 and FIG. 5. In this example embodiment the torsion spring 11 lays concentric with the gate post 4 upon which inner gate panel 5 and outer gate panel 3 rotate. When inner gate panel 5 and outer gate panel 3 are rotated into a set position, potential energy is stored in torsion spring 11 creating a force in the direction of closing. This closing force can be created with a multitude of bias devices. For example, a tension spring attached to either inner gate panel 5 or outer gate panel 3 with an appropriate lever arm, relative to the axis of rotation, is capable of creating a moment large enough for closure of either inner gate panel 5 or outer gate panel 3. In addition, inner gate panel 5 and outer gate panel 3 are not limited to rotate about gate post 4. In cases where gate posts are not used, other methods such as a knuckle joint can be used for the pivot point of inner gate panel 5 and outer gate panel 3.

Figure 6A:
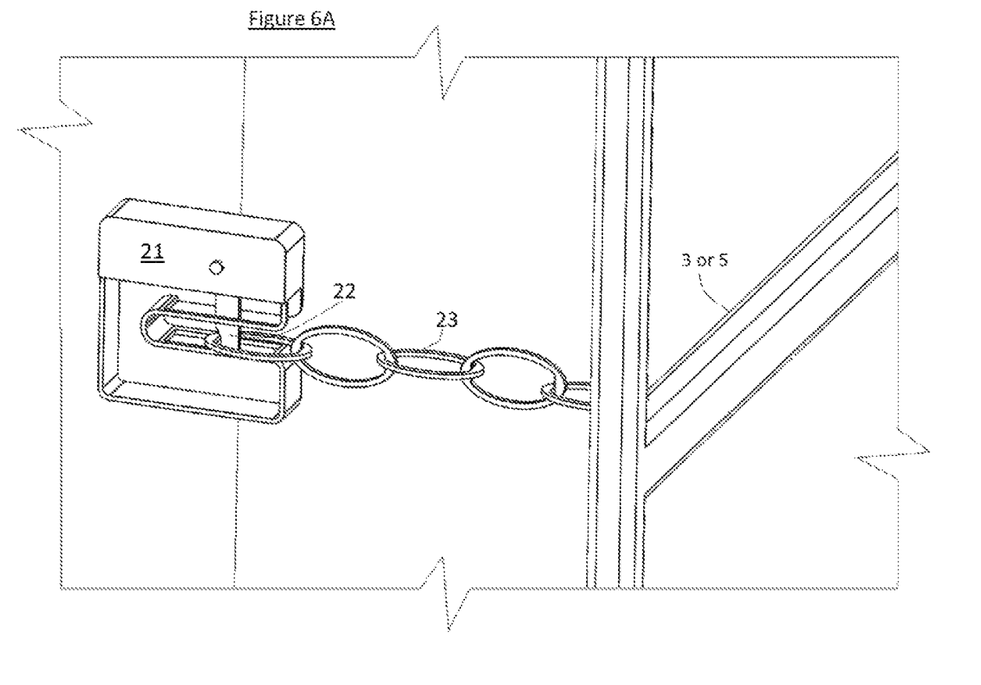
FIG. 6A is an illustration of the electromechanical latch, that when triggered allows the gate panel to shut.
Figure 6B:
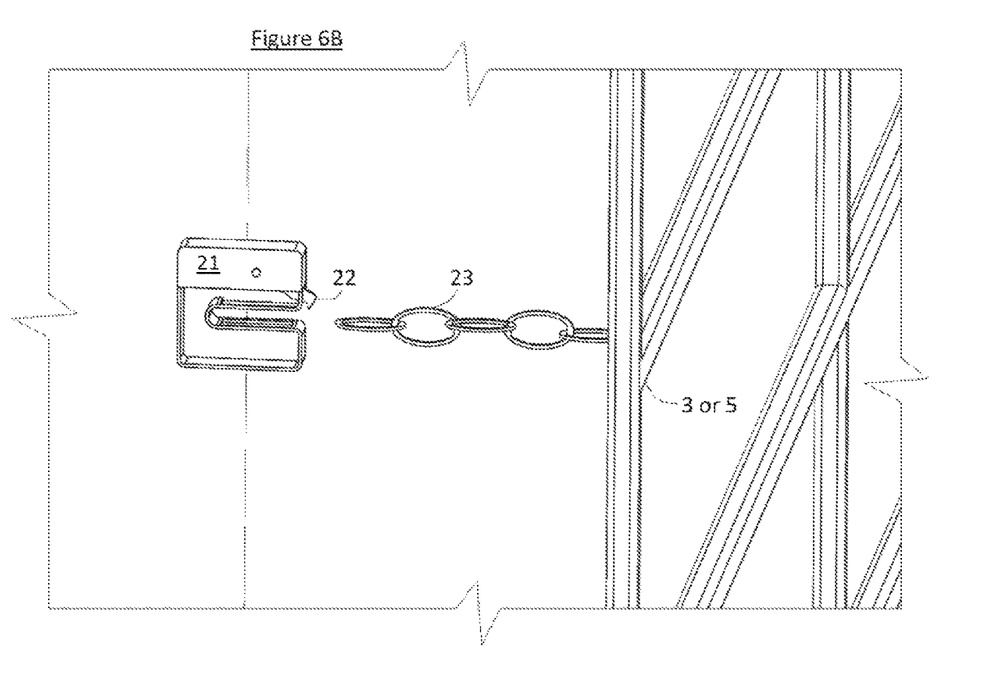
FIG. 6B is an illustration of the electromechanical latch triggered and allowing the gate panel to shut.

Inner gate panel 5 and outer gate panel 3 are held in an open position by electromechanical latch 21. An example of this is seen in FIG. 6A in which electromechanical latch 21 is mounted on either a post or livestock panel 1. The preferred embodiment of the present invention includes chain 23 to connect either inner gate panel 5 or outer gate panel 3 to electromechanical latch 21. Chain 23 is mounted on the end of inner gate panel 5 and outer gate panel 3 opposing the end of rotation. Chain 23 is placed in electromechanical latch 21 and held in place by trigger pin 22, which holds back inner gate panel 5 or outer gate panel 3. When triggered, electromechanical latch 21 moves trigger pin 22 from a latched to unlatched position allowing either inner gate panel 5 or outer gate panel 3 to close, shown in FIG. 6B.

Figure 7:
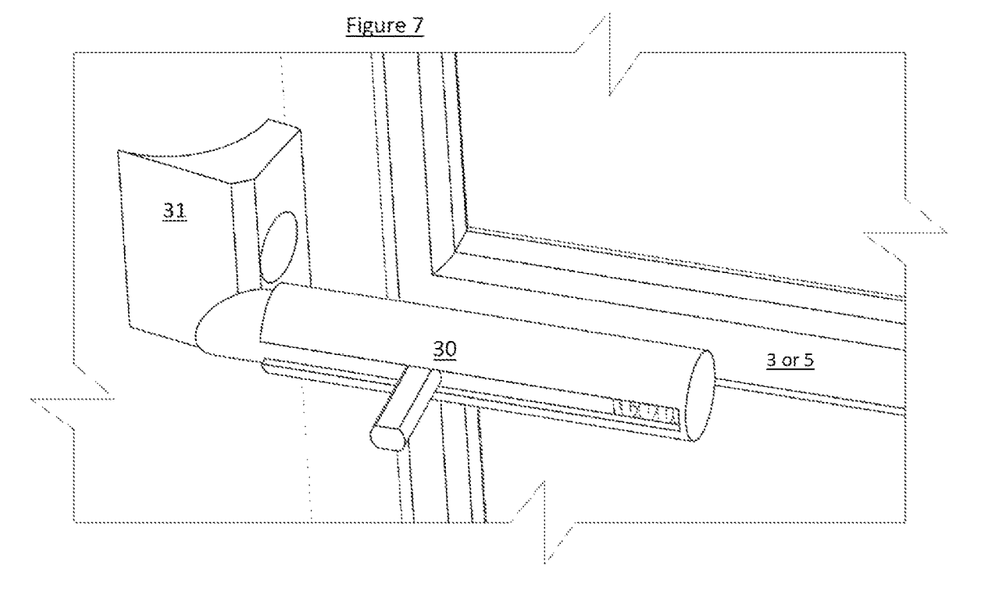
FIG. 7 is an illustration of the spring-loaded locking pin and receptacle.

Being that outer gate panel 3 closes to the inside perimeter, it is not crucial for it to lock in position once closed. Outer gate panel 3 can include spring-loaded locking pin 30 and locking pin receptacle 31 shown in FIG. 7, but it is not required. It can instead utilize the torsion spring 11 to hold outer gate panel closed 3, as long as outer gate panel 3 has a rigid stop in the closed position. Animals attempting to escape only attempt to push, never pull, making this method effective. Inner gate panel 5 closes to the outer perimeter of the inner containment, making spring-loaded locking pin 30 and locking pin receptacle 31 required to negate animal escape attempts. Spring-loaded locking pin 30 is mounted on either inner gate panel 5 and/or outer gate panel 3 on the end opposing the end of rotation. When inner gate panel 5 or outer gate panel 3 moves into the closed position, the momentum caused by the rotation forces the engagement side of spring-loaded locking pin 30 into the engagement side of the locking pin receptacle 31, which are both preferably beveled. This engagement causes a force that moves spring-loaded locking pin 30 back into its housing until the tip of spring-loaded locking pin 30 drops into the depression of locking pin receptacle 31, locking either inner gate panel 5 or outer gate panel 3 in place.

Figure 8:
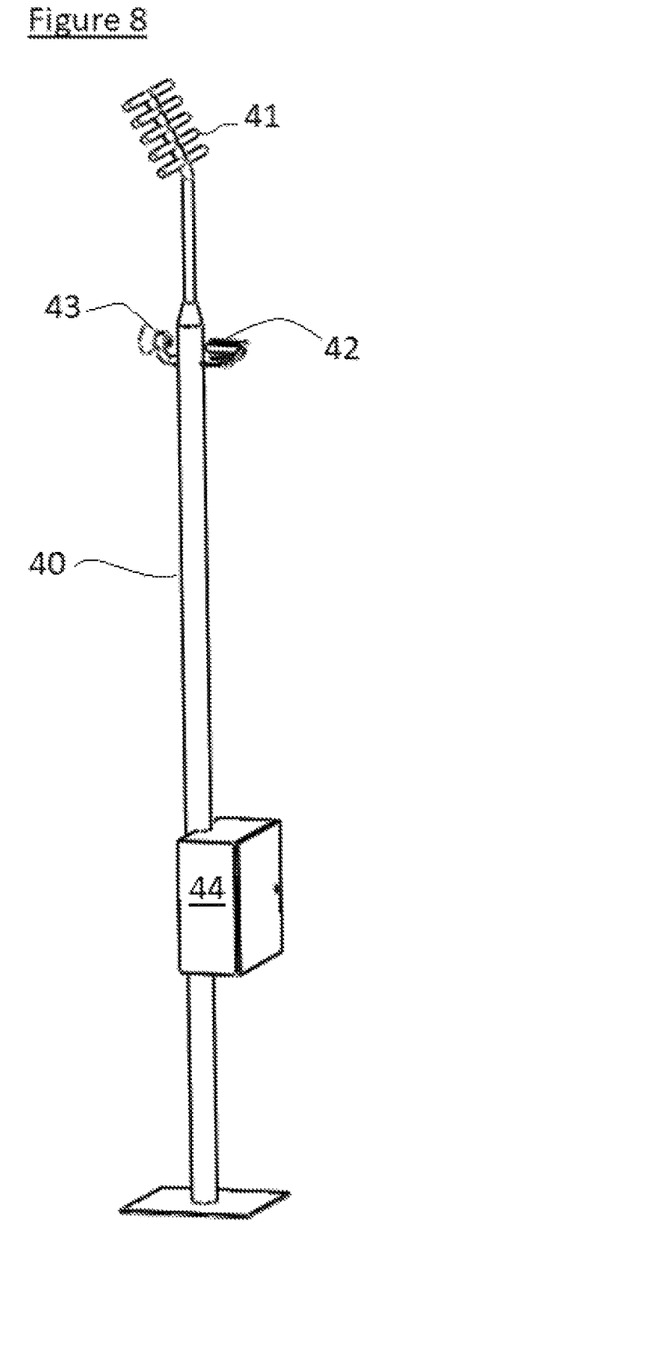
FIG. 8 is an illustration of the control tower of the invention.
Figure 9:
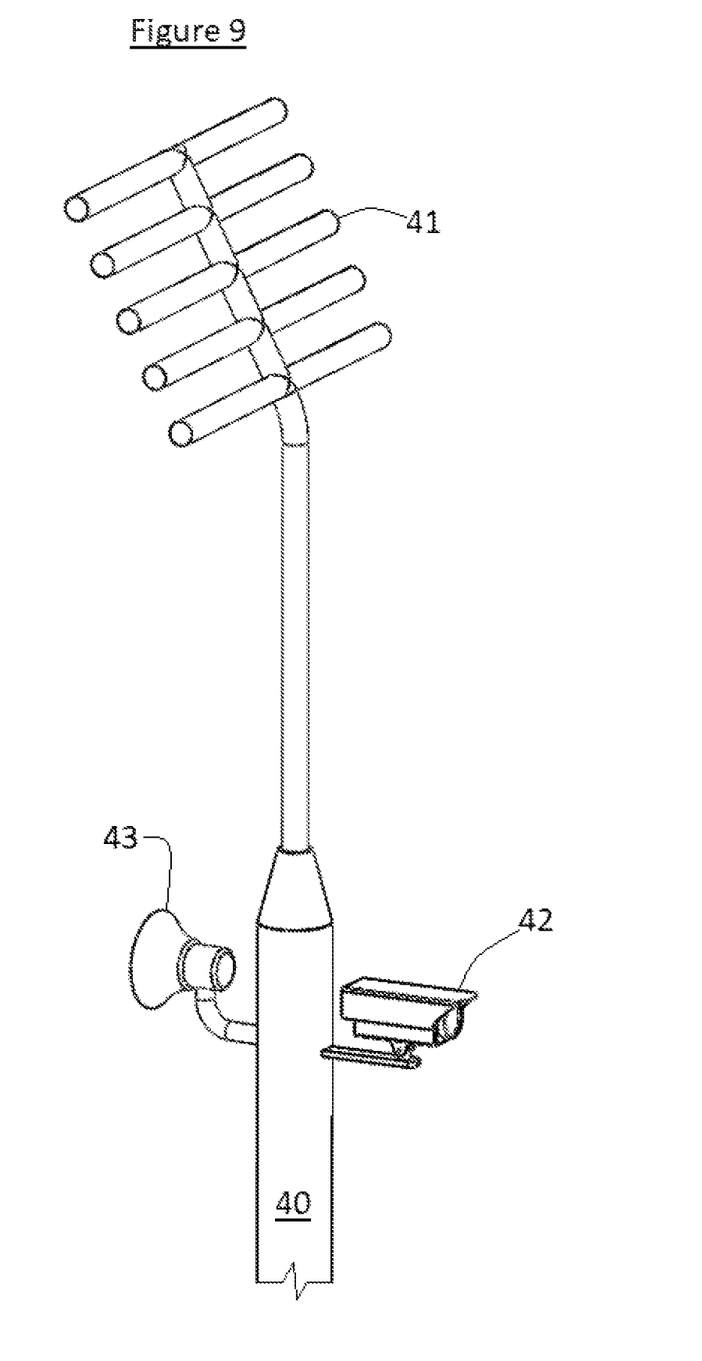
FIG. 9 is a closer view angle of the control tower.
Figure 10:
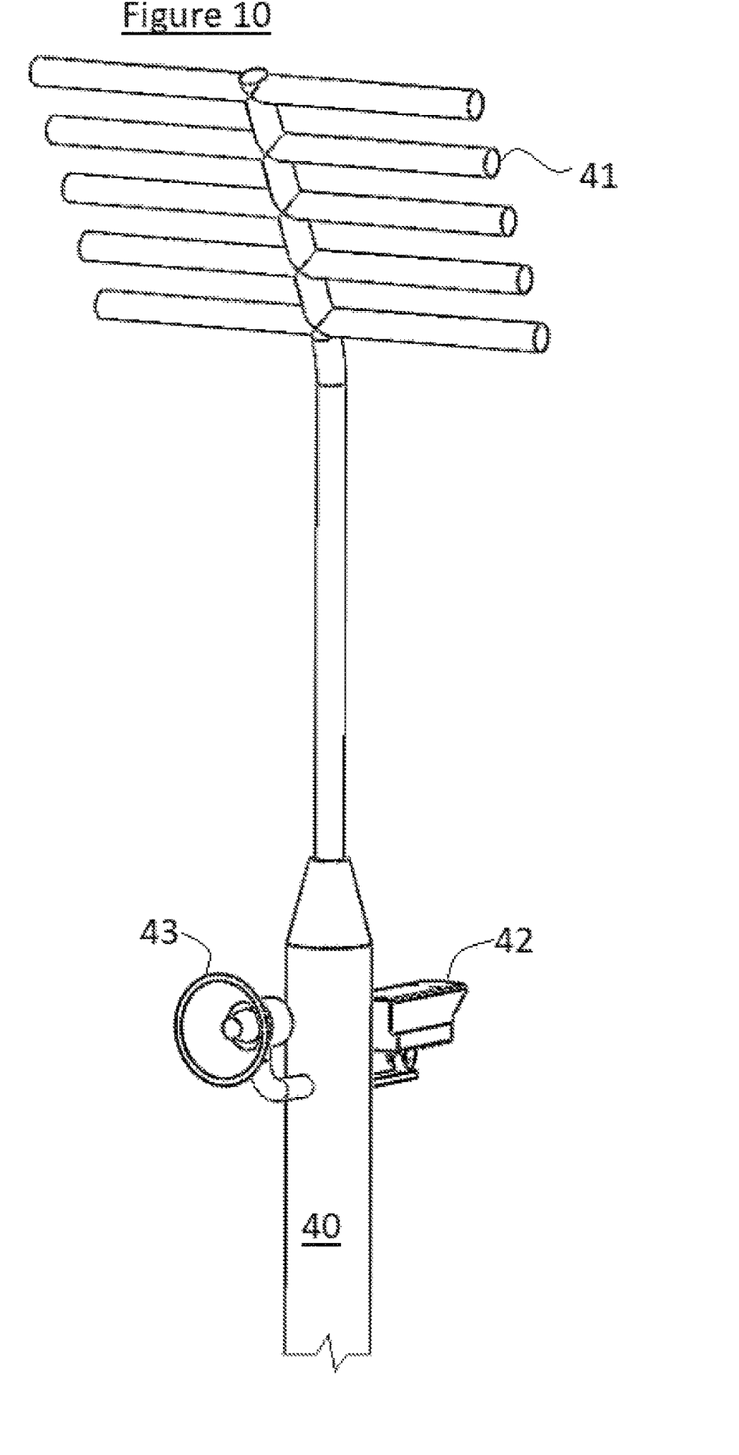
FIG. 10 is another angle of a closer view of the control tower.

For observation and actuation of the present invention it is preferable that control tower 40 is utilized in conjunction. Control tower 40, seen in FIGS. 8, 9 and 10, comprises control box 44, one or more camera 42, speaker 43 and antenna 41. Control tower 40 is responsible for transmitting real-time data from camera 42 and, possibly, other sensors to a user's computer or cell phone by means of antenna 41 communicating with a cellular network. It is preferable that the present invention utilizes motion sensors, which in-turn alert the user to animal presence. Once alerted, the user can observe real-time data captured by camera 42 to make decisions, which relate to outputs sent from control box 44 to speaker 43 or electromechanical latch 21. For example, if un-targeted animals are observed at the present invention, a preferably frightening sound can be played through speaker 43 based on the user's input, scaring away unwanted animals. Conversely, if the target animals do not a arrive in a standard time, a comforting or enticing sound can played through speaker 43. Being that the present invention is specialized for family or social group animals, sounds can include but are not limited to calls from animals of the same species. These calls can bring the targeted animals into a point that the consumables placed inside the containment become effectively enticing. Once the target animals are present at the present invention the user can make decisions to most effectively trap said animals based off data collected from camera 42 sent to control box 44 and then sent to the user via antenna 41. All trapping protocols described herein may be executed by user based off real-time data relayed by control tower 40.

Figure 11:
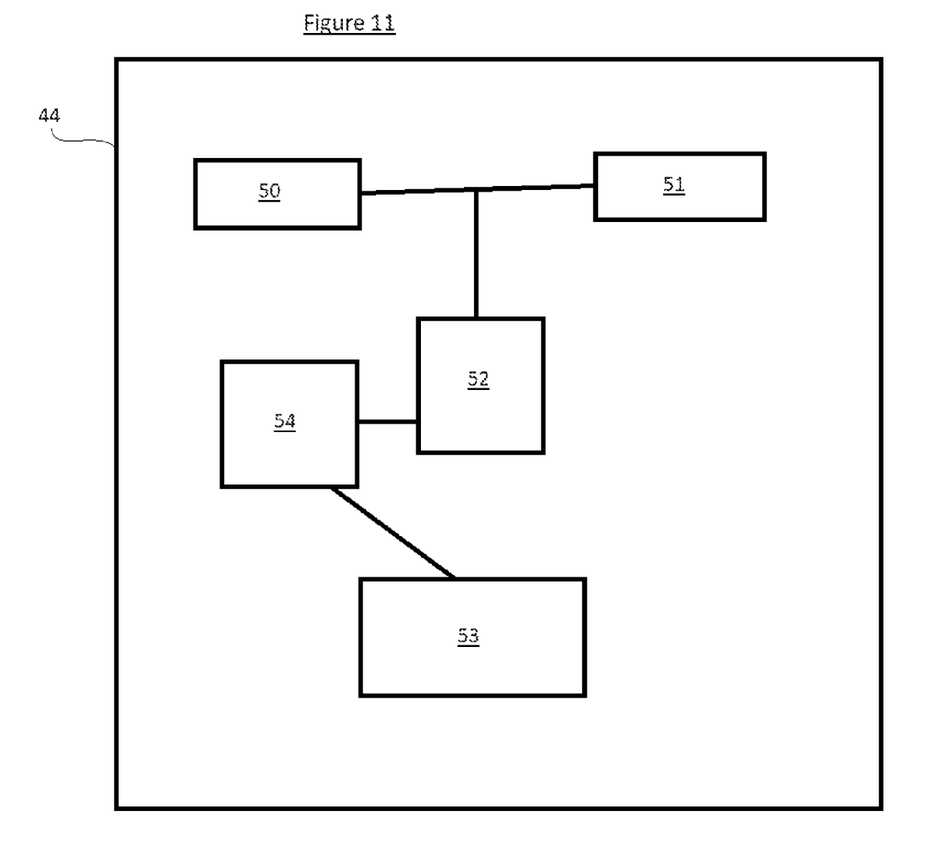
FIG. 11 is an illustration of the components inside the control box.

Control box 44 houses signal booster 50, network router 51, central process unit 52, battery 53 and voltage regulator 54, if required. Signal booster 50 amplifies weak cell service, if needed. Network router 51 connects multiple networks and forwards data packets to user device or central processing unit 52. Central processing unit 52 receives data that is processed and in turn generates corresponding outputs to system for control of devices. Central processing unit 52 communicates with network router 51, electromechanical latch(s) 21, camera(s) 42, and speaker 43. Battery 53 is responsible for powering all electronics in system and is preferably recharged by a solar array and protected by a solar controller. If the input voltage of any of said electronics is lower than battery 53 voltage, voltage regulator 54 can be used to adjust voltage to the proper level.

Additionally, the present invention can instead be autonomously controller by a programmable logic controller which, like the user in the paragraph above, makes decisions discussed above based off data collected by sensors or camera 42.

Control box 44 can send and receive signals from all electrical components through electrical wiring and/or wireless means, such as but not limited to Bluetooth and/or radio.

The present invention can be designed in such a way that it can unfold from a trailer for quicker and easier transportation and assembly. In addition, the control tower 40 can be installed on said trailer, in which it can be laid down and fastened for transportation and stood up during assembly. Said trailer may contain water storage as well as other storage for consumables used in the invention.

The preferred embodiment of the present invention has been demonstrated with dual containment but is not limited to such. The invention can be adapted to include as many containment areas as required for certain scenarios.

What is claimed:

1. An apparatus for trapping large animals, the apparatus comprising:
    a first plurality of panels configured to define an outer perimeter and an outer containment zone, wherein the first plurality of panels comprises a first gate; and
    a second plurality of panels configured to define an inner perimeter and an inner containment zone, wherein the inner perimeter comprises a second gate, wherein the first gate and second gate are configured to be activated to automatically move between an open position and a closed position, and
    wherein, when the first gate and the second gate are activated to the closed position, the inner containment zone is independent of the outer containment zone, such that the second plurality of panels do not contact the first plurality of panels.

2. The apparatus of claim 1, wherein the first plurality of panels and second plurality of panels are each configured to be arranged in a circular shape.

3. The apparatus of claim 1, wherein the first gate and second gate are, respectively, connected to a bias component, which forces the first gate and the second gate into the closed position.

4. The apparatus of claim 3, further comprising electromechanical latches, which, when latched, are configured to hold each of the first gate and the second gate in the open position, wherein the electromechanical latches, when unlatched, are configured to release the first gate and the second gate allowing for closure of the first and the second containment zones.

5. The apparatus of claim 1, further comprising a control tower, the control tower comprising:
    one or more speakers;
    one or more cameras;
    an antenna; and
    a control box.

6. The apparatus of claim 5, wherein the control box comprises:
    a signal booster;
    a network router;
    a central process unit; and
    one or more batteries.

7. The apparatus of claim 1, wherein the apparatus is stored, transported, and deployed from a trailer.

8. A method for trapping animal subjects, the method comprising:
    constructing an outer perimeter with a first plurality of panels defining an outer containment zone, wherein the first plurality of panels comprises a first gate; and
    constructing an inner perimeter with a second plurality of panels, defining an inner containment zone, wherein the second plurality of panels comprises a second gate, wherein the first gate and second gate are configured to be activated to automatically move between an open position and a closed position, and
    wherein the second plurality of panels do not contact the first plurality of panels when the first gate and the second gate are closed.

9. The method of claim 8, further comprising deploying consumables as attractants for the animal subjects.

10. The method of claim 8, further comprising deploying audio as attractants for the animal subjects.

11. The method of claim 8, further comprising deploying audio as a deterrent for untargeted animal subjects.

12. The method of claim 8, detecting, using one or more motion detection devices, a presence of an animal subject.

13. The method of claim 8, further comprising transmitting, using an antenna, trap condition data from a camera to a remote location.

14. The method of claim 13, further comprising receiving, at a control box, a remote input to independently actuate one or both of the first gate or the second gate.

15. The method of claim 13, further comprising receiving, at a control box, a remote input to actuate an audio output.

16. The method of claim 8, further comprising constructing the outer perimeter and the inner perimeter in a circular shape.

* * * * *